United States Patent
Bhardwaj et al.

(10) Patent No.: US 7,835,701 B2
(45) Date of Patent: Nov. 16, 2010

(54) DETECTING AND ELIMINATING SPURIOUS ENERGY IN COMMUNICATIONS SYSTEMS VIA MULTI-CHANNEL PROCESSING

(75) Inventors: Manish Bhardwaj, Cambridge, MA (US); Garret Shih, Brookline, MA (US)

(73) Assignee: Edgewater Computer Systems, Inc., Ottawa, Ontario (CA)

( * ) Notice: Subject to any disclaimer, the term of this patent is extended or adjusted under 35 U.S.C. 154(b) by 401 days.

(21) Appl. No.: 11/093,031

(22) Filed: Mar. 29, 2005

(65) Prior Publication Data

US 2006/0030267 A1    Feb. 9, 2006

Related U.S. Application Data (60) Provisional application No. 60/557,330, filed on Mar. 29, 2004.

(51) Int. Cl.
*H04B 17/00* (2006.01)

(52) U.S. Cl. ............... 455/67.11; 455/63.1; 455/67.13; 455/62; 455/552.1; 455/501; 455/426.1; 455/448; 455/71

(58) Field of Classification Search ........... 455/63.13, 455/67.11, 67.13, 63.1, 62, 552.1, 501, 426.1, 455/448, 71
See application file for complete search history.

(56) References Cited

U.S. PATENT DOCUMENTS

| | | | | |
|---|---|---|---|---|
| 3,961,143 A * | 6/1976 | Thyssens | .................. | 340/2.1 |
| 4,170,759 A * | 10/1979 | Stimple et al. | ........... | 455/277.1 |
| 4,335,468 A * | 6/1982 | Foster et al. | ................ | 455/501 |
| 5,245,610 A * | 9/1993 | Lindell | ........................ | 370/329 |
| 5,428,833 A * | 6/1995 | Reitberger et al. | .......... | 455/304 |
| 5,440,228 A * | 8/1995 | Schmidt | .................. | 324/76.12 |
| 5,574,979 A * | 11/1996 | West | ......................... | 455/63.1 |
| 5,675,609 A * | 10/1997 | Johnson | ...................... | 375/237 |
| 5,870,427 A * | 2/1999 | Tiedemann et al. | ......... | 375/216 |
| 6,259,902 B1 * | 7/2001 | Siomkos et al. | ........... | 455/190.1 |
| 6,792,250 B1 * | 9/2004 | Zarubin | .................. | 455/115.1 |
| 6,870,815 B2 * | 3/2005 | McFarland et al. | ......... | 370/250 |
| 6,992,990 B2 * | 1/2006 | Sakusabe | ..................... | 370/293 |
| 7,162,204 B2 * | 1/2007 | Hansen et al. | ............. | 455/63.1 |
| 7,181,166 B2 * | 2/2007 | Shimada et al. | ............... | 455/62 |
| 2004/0052384 A1 * | 3/2004 | Ashley et al. | .............. | 381/94.1 |
| 2004/0078199 A1 * | 4/2004 | Kremer et al. | .............. | 704/233 |
| 2004/0151137 A1 * | 8/2004 | McFarland et al. | .......... | 370/329 |
| 2004/0156336 A1 * | 8/2004 | McFarland et al. | .......... | 370/329 |
| 2006/0030267 A1 * | 2/2006 | Bhardwaj et al. | .......... | 455/63.1 |
| 2007/0232230 A1 * | 10/2007 | Anke et al. | .................... | 455/39 |

* cited by examiner

*Primary Examiner*—Matthew D Anderson
*Assistant Examiner*—April G Gonzales
(74) *Attorney, Agent, or Firm*—Hamilton, Brook, Smith & Reynolds, P.C.

(57) ABSTRACT

The present invention allows multi-channel communications equipment to detect and eliminate a false interpretation of interference as a valid signal. The solution is based on the observation that the simultaneous arrival of energy on two independent channels is an impossible event. So, when such an event happens, it is a reliable signature of confusing out-of-band energy for a valid signal.

16 Claims, 10 Drawing Sheets

DETECTING AND ELIMINATING SPURIOUS ENERGY IN COMMUNICATIONS SYSTEMS VIA MULTI-CHANNEL PROCESSING

RELATED APPLICATIONS

This application claims the benefit of U.S. Provisional Application No. 60/557,330, filed on Mar. 29, 2004. The entire teachings of the above application are incorporated herein by reference.

BACKGROUND OF THE INVENTION

Wireless local area networks use radio frequency (RF) transmissions to communicate between roaming computer devices and access points (or base stations). In a wireless networking environment, many computer devices may need to communicate within a given area. The RF transmissions associated with the devices share the same electromagnetic spectrum, and typically follow some protocol to avoid interfering with each other. Several sharing techniques are available to promote efficient usage of the spectrum. For example, the spectrum can be shared using time division multiplexing (TDM) and/or frequency division multiplexing (FDM).

At least one common FDM approach for sharing spectrum pre-allocates the spectrum into multiple channels, each channel being allocated a respective channel bandwidth. Even having multiple channels, however, further sharing is often needed to accommodate a large number of users. A contention-based scheme can be applied to each of the channels allowing multiple devices to operate on the same channel, one device at a time.

In a contention-based system, the devices typically have some means of determining when a channel is in-use, and therefore unavailable. For example, a receiver may sample the channel, asserting a "busy" signal responsive to the channel being unavailable. The device simply checks the busy signal prior to transmission and either continues with the transmission if the channel is available, or waits and tries again at a later time. Without such a means for determining channel availability, multiple devices may attempts to use the same channel at the same time, resulting in unwanted interference.

Even with the above precautions, it is still possible for communications equipment configured to listen to a single channel within a multi-channel communications environment to suffer from the following interference. Namely, the problem results from spectral leakage of energy from signals on adjacent channels. Communications equipment is designed to transmit energy within an intended channel bandwidth. However, the signal typically includes at least some amount of unwanted energy extending beyond the channel bandwidth. This unwanted energy is referred to as spectral leakage. Such spectral leakage can lead to equipment falsely concluding that a channel is busy (i.e., there is valid energy on its channel of interest), when in fact the channel is only occupied by the unwanted spectral leakage. In contention-based systems, the equipment reacts by unnecessarily relinquishing the channel, leading to a loss in throughput.

SUMMARY OF THE INVENTION

The present invention solves the problem of unnecessarily relinquishing a contention-based channel by identifying spurious signals appearing within the channel due to spectral leakage of one or more signals on different channels. The approach relies on an underlying assumption that two signals operating on different channels and accessing their respective channels asynchronously, will not be received at substantially the same time. Thus, the presence of a spurious signal is determined when at least two signals on different channels are received at substantially the same time.

When plural channels become active near simultaneously, the signal strengths of the plural channels are compared to identify which of the plural signals is a spurious signal. Determining when plural channels become active near simultaneously includes receiving for each of the plural channels a respective channel activity signal. The channel activity signal is asserted responsive to activity on the respective channel. Near simultaneity is determined responsive to one of the channel activity signals being asserted within a predetermined time window of another of the channel activity signals.

In some embodiments, the channels are wireless communication channels, such as wireless LAN signals compliant with IEEE 802.11 standards. Alternatively or in addition, the predetermined time window can be user selectable. For example, the predetermined time window can be selected between about 2 microseconds and about 4 microseconds for an IEEE 802.11 wireless LAN.

Once the occurrence of a spurious signal is determined among plural channels, the actual spurious signal is identified so that the related channel can be correctly characterized as available. For example, when the relative signal strengths of signals received on the plural channels differ by more than a predetermined amplitude threshold, the lower-valued signal is characterized as spurious. In some embodiments, the predetermined amplitude threshold is user selectable.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

A multi-channel receiver is adapted to identify spurious signals appearing at one channel due to spectral leakage of one or more signals received at other channels. Relying on an underlying assumption that no two signals on different channels will be received at substantially at the same time in a system using an asynchronous access scheme. Thus, when at two or more signals on different channels are received at substantially the same time, at least one of the simultaneous signals is presumed to be spurious. A comparison of the energy of the two or more simultaneous signals, identifies the spurious signal as the one having a lower energy.

The present invention is particularly well suited for communications systems in which several clients or users vie for access to a shared communications medium using a contention-based protocol. This happens in, but is not limited to, wireless Local Area Networks (LAN). At least one example of such a wireless LAN is the Institute of Electrical and Electronic Engineers (IEEE) 802.11 wireless communication standard. Another prominent example is HiperLAN. Accordingly, wireless LANs, and specifically wireless LANs according to the 802.11 standard are used to elucidate the key aspects of the invention. Anyone skilled in the field will see its utility in similar scenarios in other types of networks. Additionally, an illustrative example is used to describe the invention including a three-channel system. Extensions to two channels and more than three channels are trivial.

Figure 1:
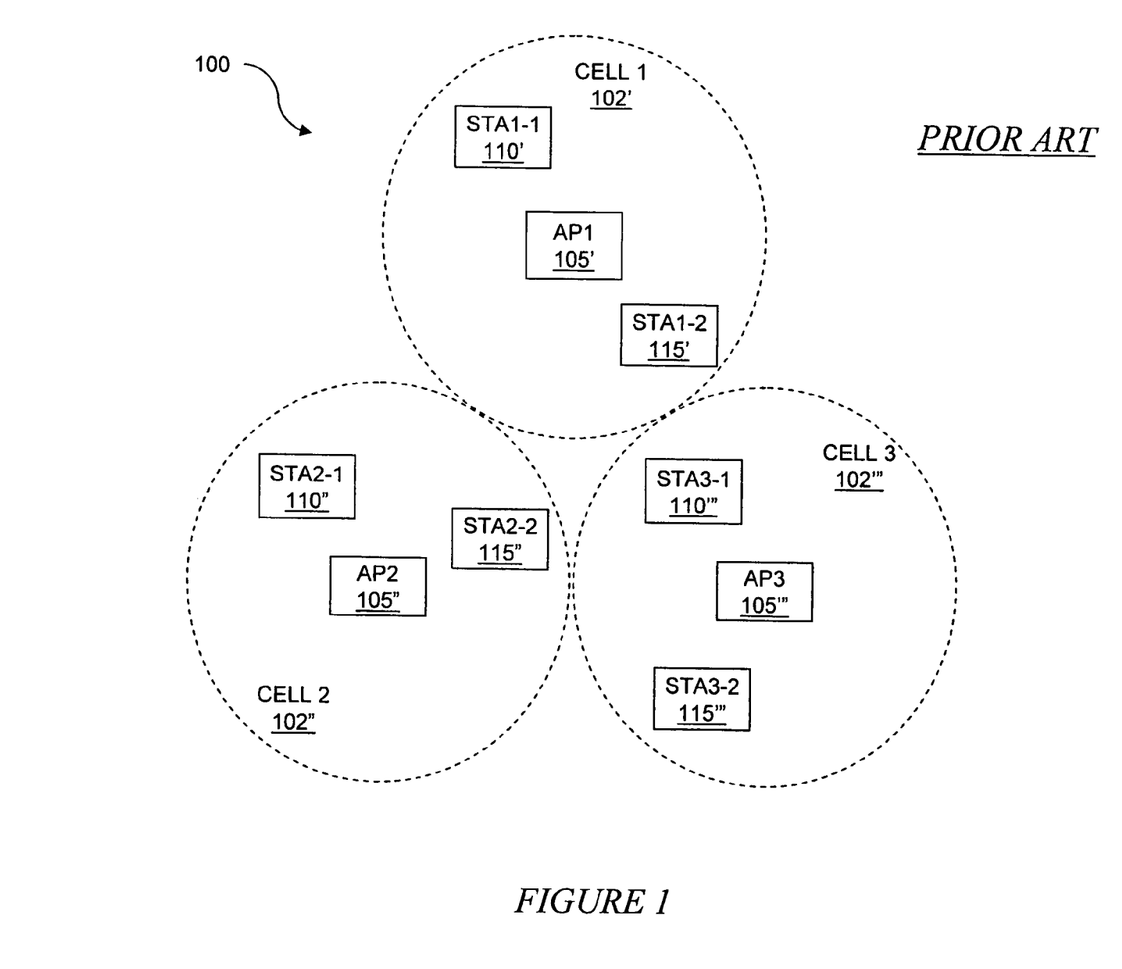
FIG. 1 is a schematic diagram of a prior art wireless communication architecture.

A typical wireless LAN (e.g., an 802.11 wireless LAN) 100 is shown in FIG. 1. The wireless LAN 100 includes multiple cells or coverage regions. For example, the wireless LAN 100 includes three cells: Cell$_1$ 102', Cell$_2$ 102", and Cell$_3$ 102''' (generally 102). Each cell 102 includes a respective single-channel Access Point (AP) 105', 105", 105''' (generally 105). The access points 105 are configured to communicate with one or more wireless stations (STAs) or clients. For example, Cell$_1$ 102' communicates with a first and second wireless stations (e.g., STA1-1 110' and STA1-2 115'). Similarly, Cell$_2$ and Cell$_3$ also communicate with respective first and second STAs (e.g., STA2-1 110" and STA2-2 115" communicating with Cell$_2$ 102", and STA3-1 110''' and STA3-2 115''' communicating with Cell$_3$ 102''').

This wireless LAN 100 represents a typical deployment, within which adjacent cells 102 are configured to use different channels according to a channel-reuse scheme. For example, cell$_1$ 102' is configured to use channel 1 (i.e., having a center frequency, Fc=2,412 MHz), while cell$_2$ 102" and cell$_3$ 102''' are configured to use channels 6 and 11, respectively (i.e., channel 6 having Fc=2,437 MHz, and channel 11 having Fc=2,462 MHz). All STAs 110, 115 operating within a cell 102 preferably use the channel assigned to that cell 102.

Although AP$_1$ 105' communicates with STA1-1 110' on pre-configured channel 1, the communications are affected to different degrees by signals or packets being transmitted on any of the other channels of the wireless LAN 100 (e.g., packets originating from AP$_2$ 105", STA2-1 110", STA2-2 115", on channel 6, and/or packets originating from, AP$_3$ 105''' STA3-1 110''', and STA3-2 115''' on channel 11). This affect on one channel from activity on another channel occurs in all practical communications systems and results from packet energy leaking from one channel onto adjacent channels.

Figure 2:
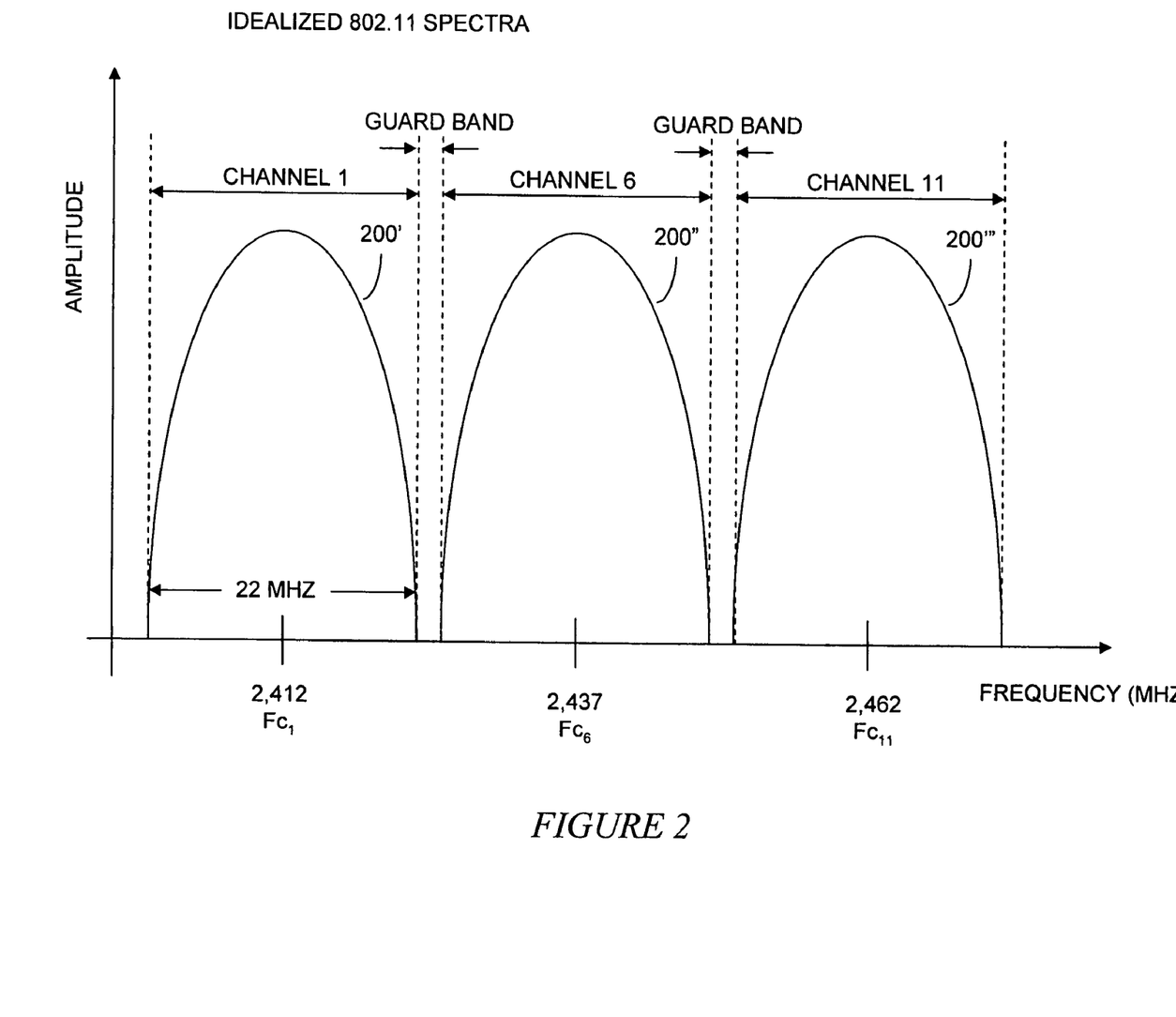
FIG. 2 is a representation of an exemplary idealized IEEE 802.11 signal spectrum.

FIG. 2 illustrates an idealized 802.11 frequency spectrum for 802.11 channels 1, 6, and 11. As shown, each of the channels is centered at its respective center frequency, Fc. Namely, channel 1 is centered at Fc=2,412 MHz, channel 6 is centered at Fc=2,437 MHz, and channel 11 is centered at Fc=2,462 MHz. According to the 802.11 standard, each channel is allotted a respective channel bandwidth about the channel's center frequency (e.g., 22 MHz, or Fc+/−11 MHz). Additionally, a guard band (e.g., 3 MHz) can be provided between each of the adjacent channels. The signal spectra 200', 200", 200''' shown are referred to as idealized, as each spectrum reside completely within its respective channel. Thus, virtually no signal energy or spectral leakage from a signal in one channel appears in either of its adjacent channels. Unfortunately, for any realizable signal there will be some signal energy outside of its assigned channel bandwidth.

Figure 3A:
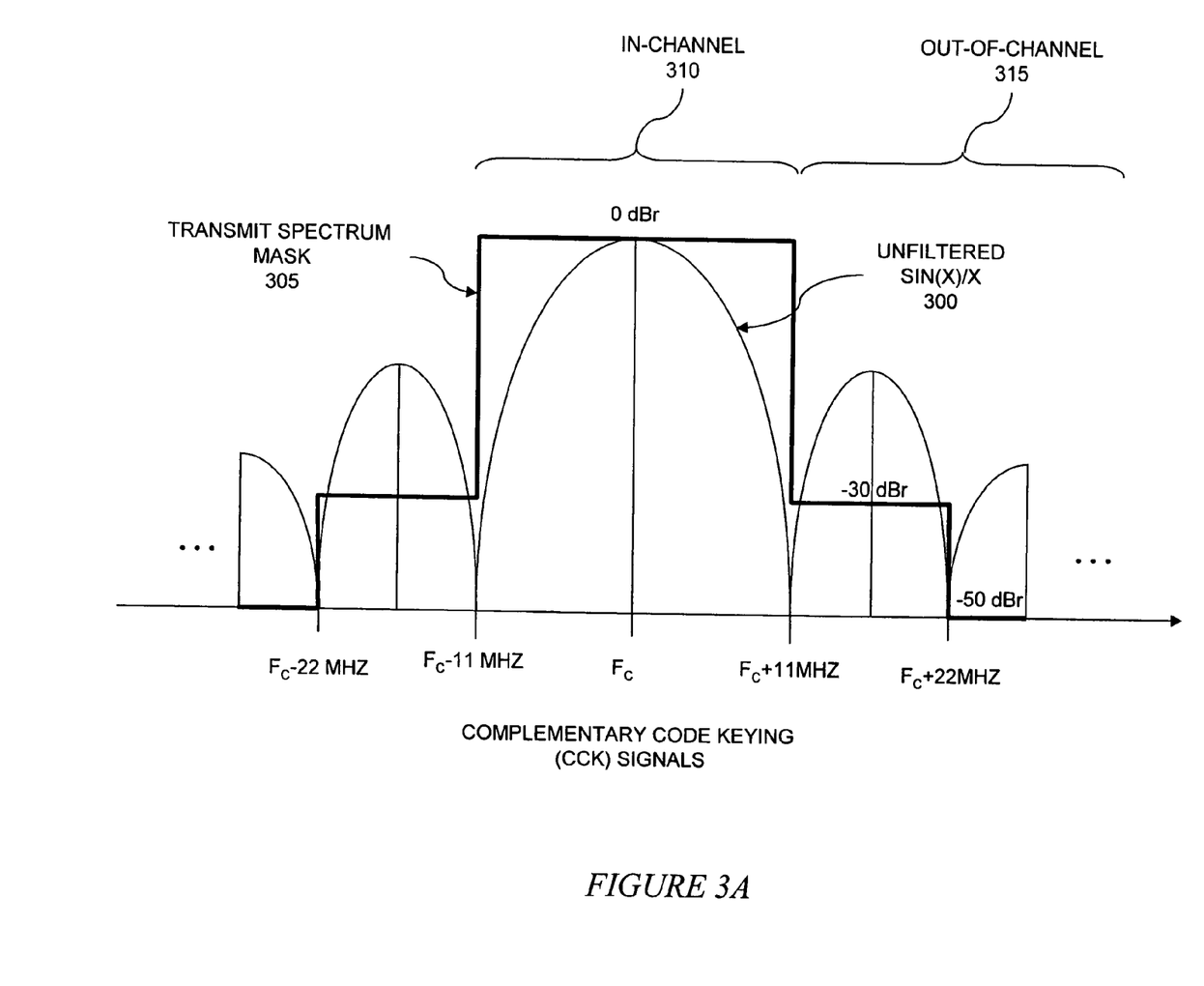
FIG. 3A is an exemplary signal spectrum of a Complementary Code Keying (CCK) modulated signal superimposed on a transmit spectral mask.

An exemplary Complementary Code Keying (CCK) modulated signal spectrum 300 is illustrated in FIG. 3A. As described above, the signal occupies a 22 MHz channel bandwidth, centered about its center frequency Fc. The portion of the signal spectrum between about Fc−11 MHz and Fc+11 MHz is referred to as "in-channel" 310. Similarly, those portions of the signal spectrum that are not in-channel 310 can be referred to as "out-of-channel" 315.

A CCK transmit spectrum mask 305 is superimposed on the CCK signal spectrum 300. The spectral mask 305 defines zero attenuation (i.e., 0 dBr) for in-channel 310. The spectral mask 305 also defines different thresholds for out-of-channel energy, as shown, depending on the offset from the center frequency Fc. For example, transmitted signal energy that is out-of-channel, and occurs at frequency offsets between about 11 and 22 MHz measured from Fc, should have respective amplitudes that are no more than 30 dB below the in-channel amplitudes. As shown, the unfiltered sin(x)/x spectrum 300 violates the out-of-channel spectral containment defined by the CCK transmit spectrum mask 305. Filtering can be applied at the transmitter to reduce the out-of-channel signals.

Figure 3B:
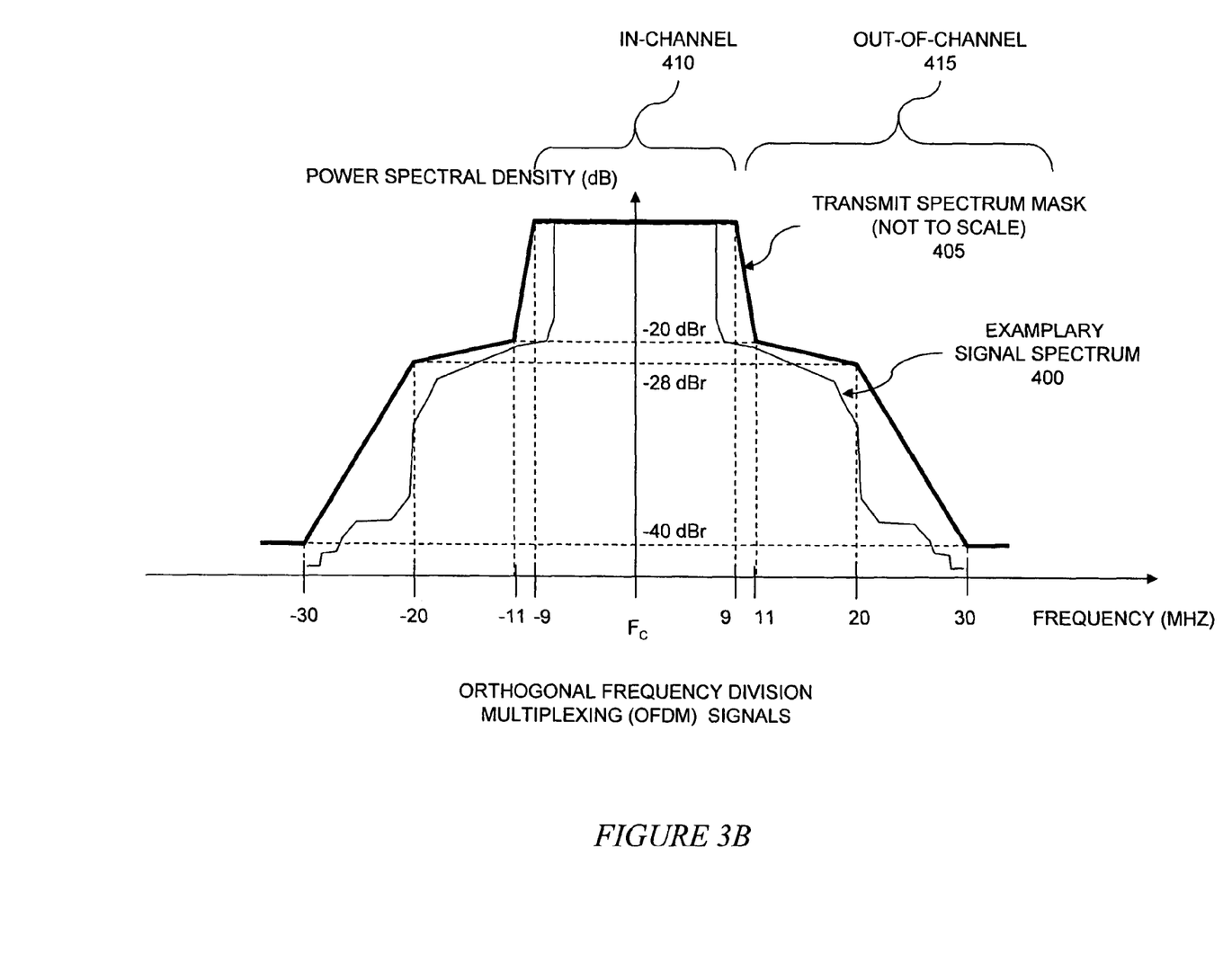
FIG. 3B is an exemplary signal spectrum of an Orthogonal Frequency Division Multiplexing (OFDM) modulated signal superimposed on a transmit spectral mask.

A similar transmit spectrum mask 405 is illustrated in FIG. 3B for Orthogonal Frequency Division Multiplexing (OFDM) signals. An exemplary signal spectrum 400 is shown that satisfies the spectral containment defined by the corresponding transmit spectrum mask 405. Again, in-channel 410 signal energy is allowed to pass without attenuation, whereas out-of-channel 415 energy is defined with varying levels of attenuation as defined by the transmit spectrum mask 405.

Figure 4:
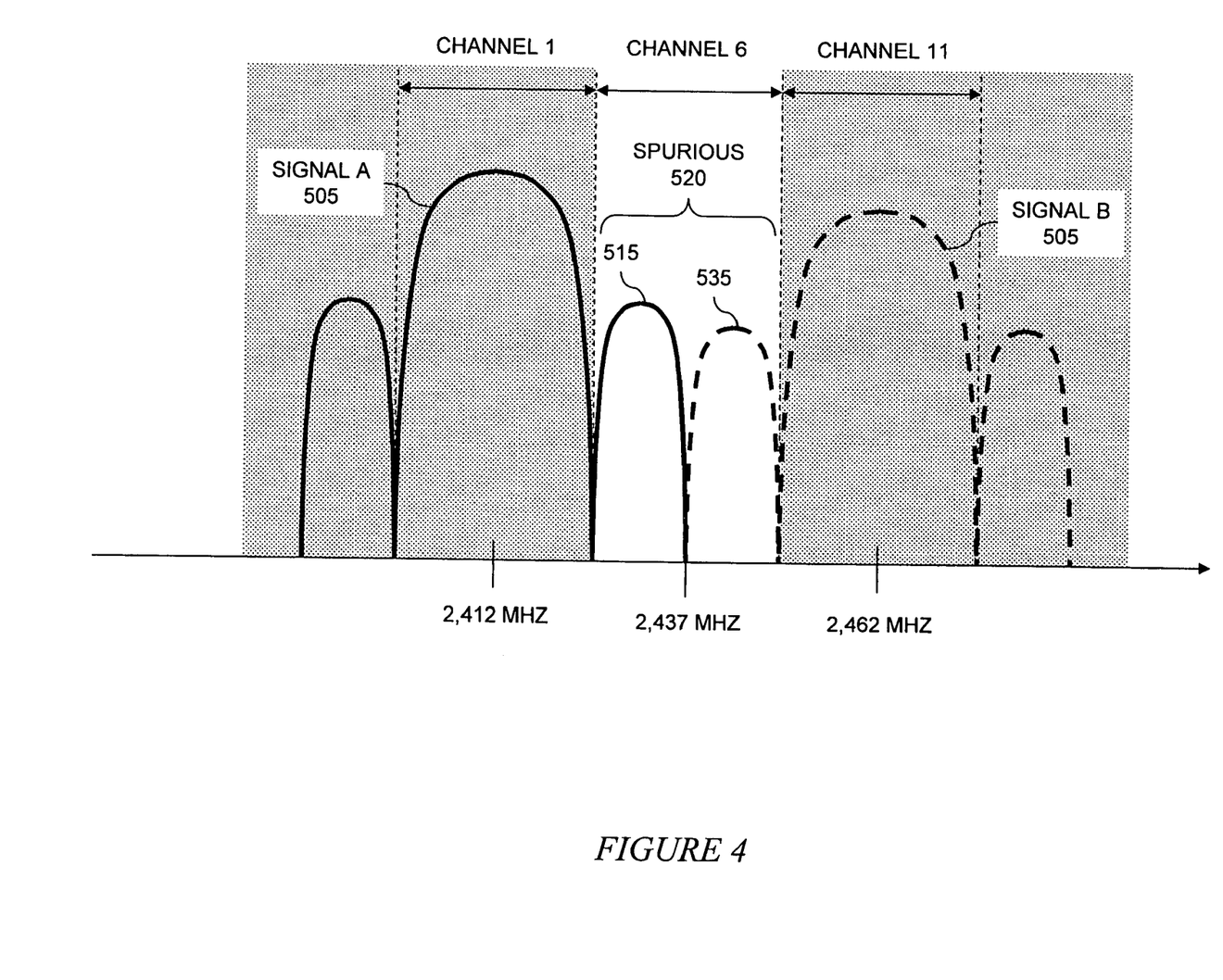
FIG. 4 is a representation of spurious signals resulting from adjacent-channel signals.

Even when transmit signals are compliant with their respective transmit spectrum masks 305, 405, there will be some measurable amount of energy appearing in the out-of-channel regions 315, 415. FIG. 4 shows how out-of-band leakage on channels 1 and 11 can occur with adjacent channel 6. Thus, an out-of-channel portion of a first signal 515 transmitted on channel 1 appears within the allocated channel bandwidth of adjacent channel 6. Alternatively or in addition, an out-of-channel portion of a second signal 535 transmitted on channel 11 appears with the allocated channel bandwidth of adjacent channel 6. A receiver receiving signals on channel 6 can falsely interpret either out-of-channel signal energy 515, 535 as valid energy on channel 6. As this out-of-channel signal energy 515, 535 is unwanted, it is referred to as spurious energy.

Such spurious energy occurring within the frequency spectrum of a receiver's assigned channel can cause a wireless LAN access point 105 to falsely conclude that the channel is occupied. Such erroneous conclusions that a channel is occupied when, in fact, the channel is available is problematic for contention-based systems. At least one example includes 802.11 wireless LANs, in which the 802.11 Medium Access Control (MAC) scheme is contention-based. Thus, 802.11 clients contend for a channel, relinquishing the channel (i.e., "backing off") for a random period of time if they think the channel is occupied. Hence, falsely interpreting spurious, or leakage energy as an occupied channel can lead to a significant loss of throughput, as the channel is erroneously left idle, while packet traffic is left waiting. In a worst-case scenario, it is conceivable that the throughput of an affected access point 105 can approach zero.

The issue of detecting and eliminating spurious energy created by activity on an adjacent channel is solved within a multi-channel access point. A 'multi-channel' access point is different from a conventional (single-channel) access point in that it is configured to support multiple channels concurrently. In general, a wireless access point includes an antenna coupled to a transceiver. In a receive mode, an information-bearing wireless signal is received at the antenna. The received signal can be pre-conditioned by amplification, attenuation, and/or filtration. The pre-conditioned signal can then be frequency translated to an intermediate, or baseband frequency. A modem is used to extract information from the received signal, the extracted information being passed to a user, or for further processing. The process is essentially reversed for transmitted signals.

Figure 5:
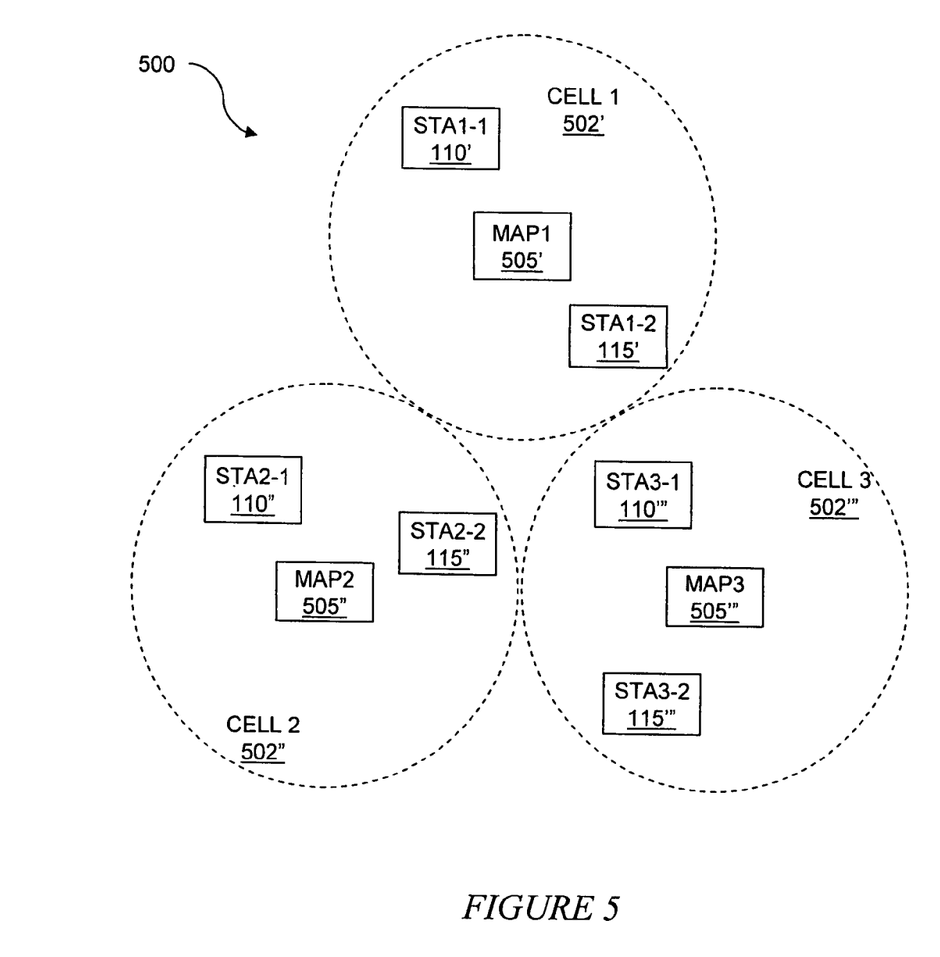
FIG. 5 is a schematic diagram of a multi-channel, wireless communication architecture.

FIG. 5 shows a wireless LAN 500 configured similarly to the wireless LAN 100 shown in FIG. 1, except that a Multi-channel Access Points (MAPs) 505', 505'', 505''' (generally 505) is respectively provided at each of the cells 102 instead of single-channel access points 105. Thus, each of the MAPs 505 is configured to operate simultaneously on more than one channel. For example, any one of the MAPs 505 can simultaneously receive and process a first signal on a first channel and a second signal on a second channel. In some embodiments, limitations are imposed on a MAP 505 restricting reception of signals on some channels, while the MAP 505 is transmitting on a different channel.

Figure 6:
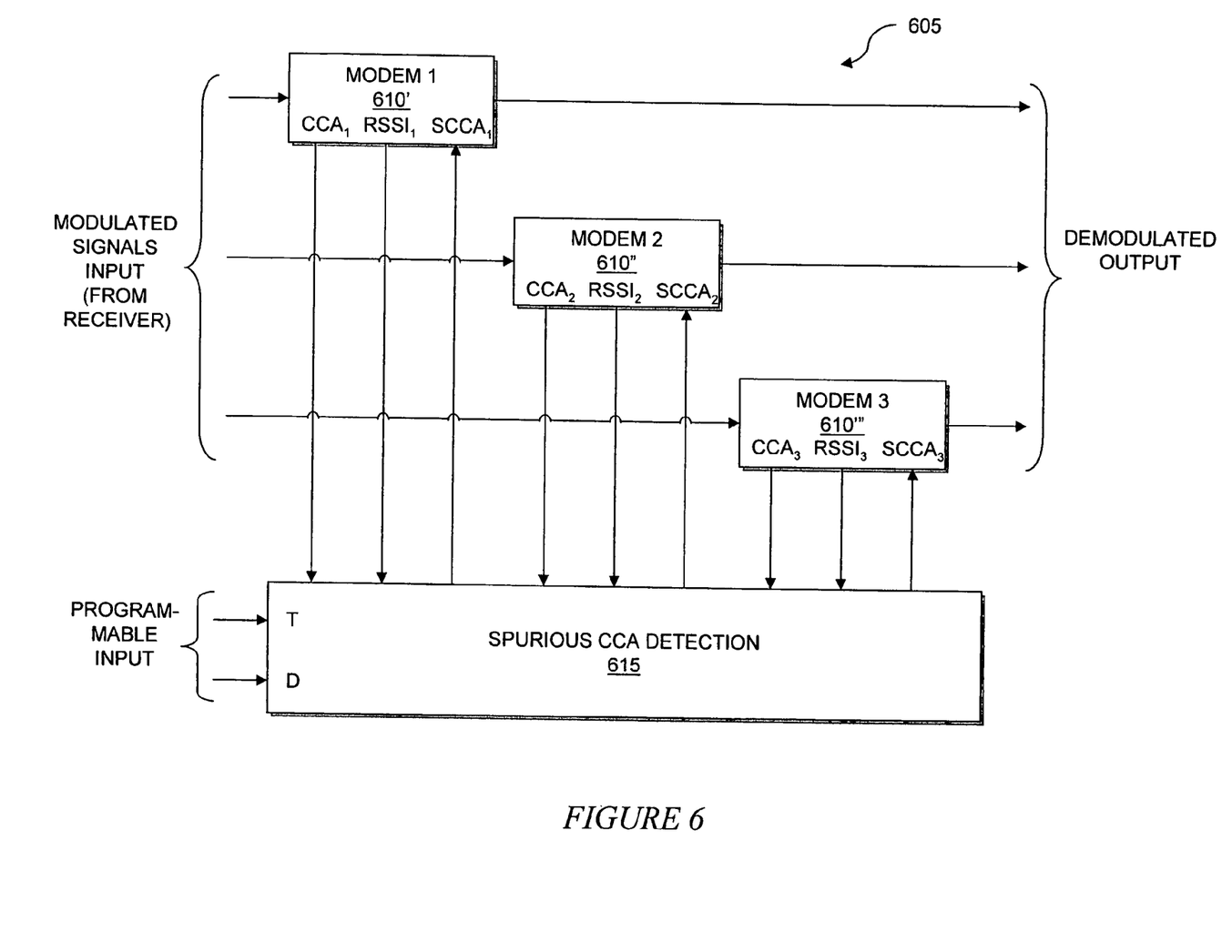
FIG. 6 is a block diagram of an exemplary receiver according to an embodiment of the invention.

Referring now to FIG. 6, an exemplary MAP 605 includes multiple modems, one modem generally being provided for each of the multiple channels supported by the MAP 605. For the exemplary three-channel embodiment, the MAP 605 includes three modems 610', 610'', 610''' (generally 610), one modem 610 for each of the three channels. Each of the modems 610 receives an input signal corresponding its respective channel. As described earlier, the wireless MAP 605 typically includes an antenna and radio frequency (RF) processing segment (not shown) for converting a received wireless signal into a form suitable for processing by the modem 610. In receive mode, the modem 610, in turn, demodulates the input signal and provides the demodulated information signal to a user and/or to other parts of the system for further processing.

In a data network, the signals typically include data in the form of packets. Each modem 610 determines the arrival of a packet (energy) within its respective channel and signals the same by asserting a Clear Channel Assessment (CCA) signal output. Thus, when a signal is received at the respective channel, the modem 510 asserts a CCA signal output. However, as described above, the same modem 610 can also provide a CCA signal output in the presence of spurious energy from one or more different channels.

The three modems 610 can be independent devices interconnected by signal leads. Care must be exercised, however, with respect to routing the interconnecting signal leads to ensure that any latency in the signal routing be kept to a minimum. Ideally, the modems 610 are in close proximity to each other. For example, the modems 610 can be provided on the same substrate or die.

The MAP 605 also includes a spurious CCA detection capability 615 for determining when a modem's CCA signal output corresponds to spurious energy. For example, the MAP 605 includes spurious CCA detection circuitry 615 receiving a respective CCA signal from each of the three modems 610 (i.e., $CCA_1$, $CCA_2$, and $CCA_3$). Whenever the spurious CCA detection circuitry 615 receives a CCA signal on one channel (i.e., from one modem 610), it searches for a CCA signal on other channels. There is an underlying assumption that since each of the channels is unsynchronized with respect to the other channels, the event of any two genuine CCA signals being received substantially simultaneously is virtually impossible. However, spurious energy of an unintended channel will typically arrive substantially simultaneously on the intended channel with the genuine packet that created it. This causes simultaneous CCA events to occur on more than one channel.

The spurious CCA detection unit 615 receives CCA signals from the different modems and determines when two or more CCA signals are received substantially simultaneously. The spurious CCA detection unit 615 concludes simultaneity when CCA signals are received on different channels within a time threshold of each other (e.g., within a time T with respect to another signal). The value of T can be user selectable (e.g., programmable). For an 802.11 application, the value of T can be defined as between about 2 and about 4 microseconds.

Figure 7:
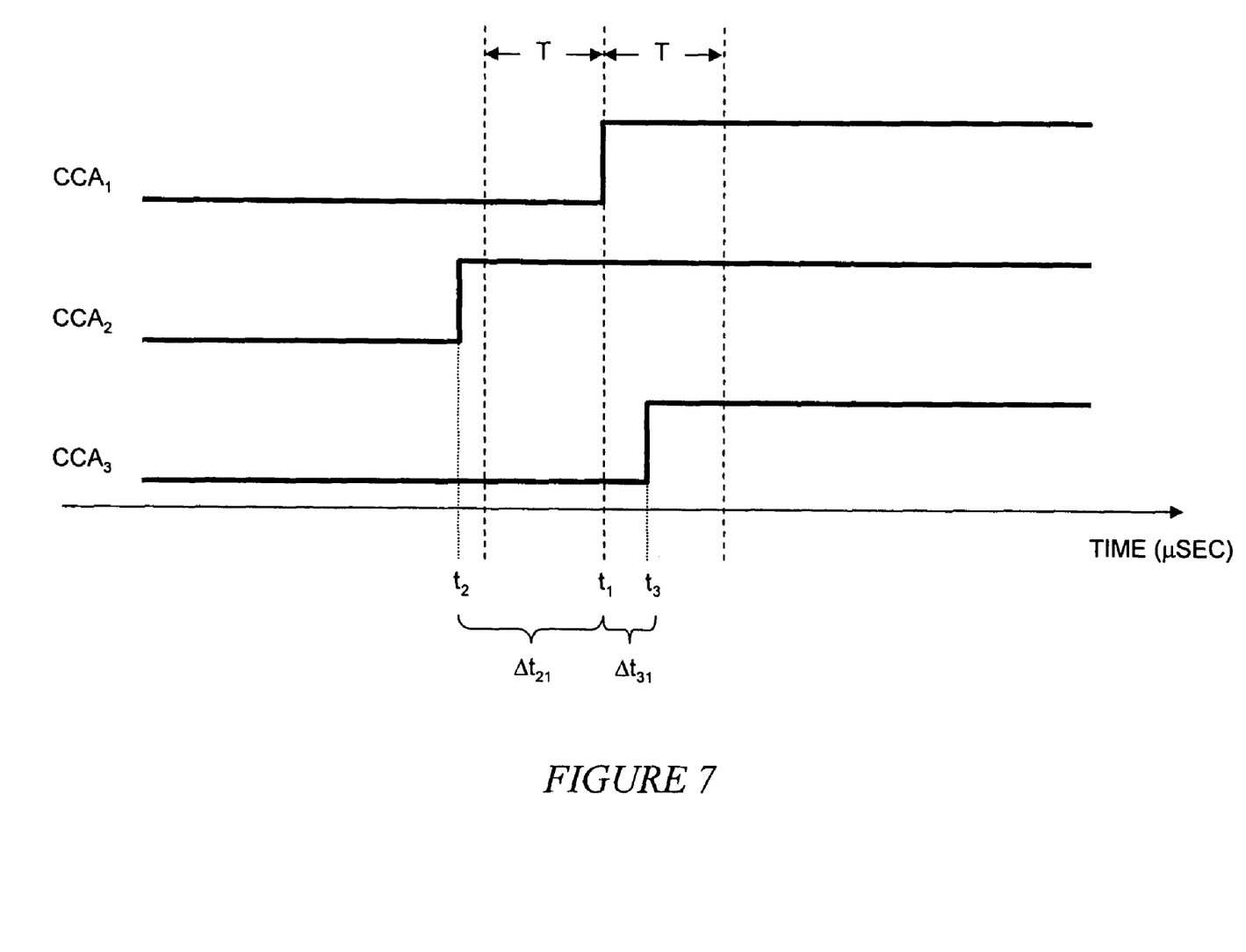
FIG. 7 is a timing diagram illustrating multiple Clear Channel Assessment (CCA) signals within a multi-channel receiver.

An exemplary timing diagram is shown in FIG. 7 illustrating a determination as to whether any two of the three CCA signals occur substantially simultaneously. In the exemplary embodiment, the CCA signal is asserted (e.g., transitions from a low value to a high value) upon the occurrence of a CCA event. Other embodiments are possible that operate in a reverse sense. The occurrence of a CCA event at the $i^{th}$ channel is associated with its corresponding transition time $t_i$ along the time axis. Thus, $CCA_2$ event occurs first at time $t_2$. Similarly, event $CCA_1$ occurs next at time $t_1$, followed by event $CCA_3$ at time $t_3$.

In some embodiments, the spurious CCA detection unit 615 determines the time delay between these adjacent CCA events, comparing the result to a time threshold T. For example:

if $|\Delta t_{21}=|t_2-t_1|\leq T$, then $CCA_1$ and $CCA_2$ are simultaneous (1a)

if $|\Delta t_{31}=|t_3-t_1|\leq T$, then $CCA_1$ and $CCA_3$ are simultaneous; and (1b)

if $|\Delta t_{32}=|t_3-t_2|\leq T$, then $CCA_2$ and $CCA_3$ are simultaneous (1c)

For the example of FIG. 7, only equation 1b is true (i.e., $CCA_1$ and $CCA_3$ are substantially simultaneous). When the MAP 605 determines the occurrence of such simultaneity, it next determines which of the two substantially simultaneous CCA signals corresponds to the actual signal, the other representing spurious energy.

Generally, the weaker of the two simultaneously-received signals corresponds to spurious energy and can thus be declared spurious once determined. As shown in FIGS. 3A and 3B, the out-of-channel spurious energy associated with a particular signal is generally much lower than the in-channel energy of the same signal. Thus, as either of the exemplary spectra is simultaneously received on more than one channels of the MAP 605, the in-channel energy is easily discernable from the out-of-channel energy as its energy level is substantially (e.g., orders of magnitude) greater. Thus, the spurious CCA detection unit 615 is configured to determine which of the more than one substantially simultaneous CCA signals corresponds to spurious energy. The spurious CCA detection unit 615 provides an output Spurious CCA (SCCA) signal to the modem 610 corresponding to the channel on which the spurious CCA occurred. In some embodiments, the SCCA output signal is a single pulse, such as a pulse provided by a "one shot" or similar monostable device. The SCCA signal can be used by the modem to avoid unnecessary backing off. For example, the modem can temporarily increase its detection threshold to a level above the level of the spurious signal. Thus, the modem 610 remains available to receive signals on its respective channel, despite the presence of spurious energy within the channel.

Given two simultaneous CCA signals, the lower energy signal can be classified spurious if the energy difference between the two signals exceeds a programmable parameter, referred to herein as D. Thus, the spurious CCA detection unit 615 receives input threshold values T and D, used in its determination of spurious signals.

Figure 8:
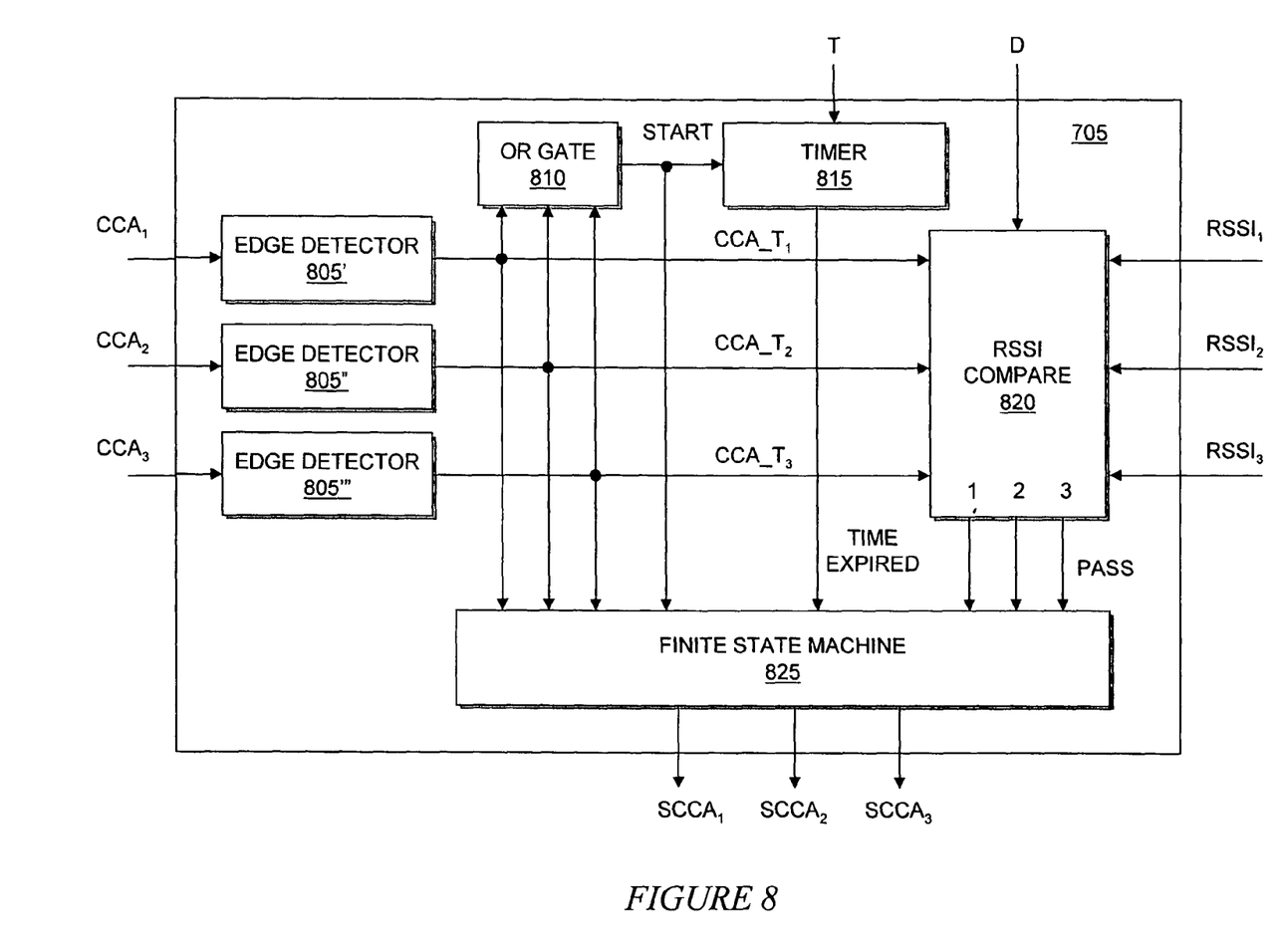
FIG. 8 is a block diagram of an exemplary spurious CCA detection function block of the block diagram shown in FIG. 6.

An exemplary embodiment of the spurious CCA detection unit 615 is illustrated in more detail in FIG. 8. Note that the apparatus shown is by no means the only way to realize the implied functionality. The spurious CCA detection unit 615 receives programmable threshold parameters T and D, as defined above. The spurious CCA detection unit 615 also receives a CCA signal from each of the three modems (i.e., $CCA_1$, $CCA_2$, and $CCA_3$). Still further, the spurious CCA detection unit 615 receives a Received Signal Strength Indicator (RSSI) corresponding to the strength (the channel's energy) of signals received on each of the MAP channels. In some embodiments, the modems 610 are configured to provide an output RSSI signal indicative of the corresponding received signal strength on its respective channel.

The spurious CCA detection unit 615 determines whether the energy received in any of the MAP channels corresponds to spurious energy, and provides a respective output SCCA (i.e., $SCCA_1$, $SCCA_2$, and $SCCA_3$) to each of the one or more corresponding modems. In some embodiments, a channel's noise threshold can be adjusted in response to identifying spurious energy. For example, the detection threshold can be temporarily raised above the level of the spurious energy for some period of time. Such a threshold adjustment can simplify signal processing, as subsequent spurious energy will be below the threshold, such that the modem will not assert a corresponding CCA signal.

In more detail, the spurious CCA detection unit 705 includes at least one edge detector 805', 805'', 805''' (generally 805) for each of the channels (i.e., modems 610) of the MAP 605. As shown, each edge detector 805 receives a CCA signal from its respective modem 610. In response to detecting a positive edge (e.g., the low-to-high transition of FIG. 7), the edge detector 805 asserts a "CCA Transition" output signal indicative of a detected edge on the corresponding channel (e.g., $CCA\_T_1$, $CCA\_T_2$, and $CCA\_T_3$). For example, the edge detector 805 asserts a CCA_T signal in response to the low-to-high CCA transition at its input. A channel for which CCA_T is asserted is termed an active channel. Note that a "low" CCA corresponds to substantially no channel activity (e.g., below a minimum energy threshold) and vice-versa.

The spurious CCA detection unit 705 includes an RSSI compare unit 820 for comparing the relative signal strengths of the received signals. For example, the RSSI compare unit 820 receives an RSSI signal input from each of the modems 610 of the MAP 605. The RSSI compare unit 820 also receives the CCA_T signal from each of the edge detectors 805 together with the user-definable amplitude threshold value D. Responsive to receiving one or more CCA_T signals, the RSSI compare unit 820 compares the corresponding RSSI signals received from the modems 610, determining which of the compared signals is less than the other by more than the amplitude threshold D. The RSSI compare unit 820 asserts a PASS signal if the corresponding channel is active and its energy is lower than that of other active channels by more than the programmable parameter D.

For the exemplary three-channel MAP 605, the RSSI compare unit 820 generates up to three PASS signals, each PASS signal indicating that the corresponding signal meets the 'weaker' criteria as defined above.

$PASS_1$: Asserted if $|RSSI_2-RSSI_1|\geq D$, spurious energy on channel 1 (2a)

$PASS_1$: Asserted if $|RSSI_3-RSSI_1|\geq D$, spurious energy on channel 1 (2b)

$PASS_2$: Asserted if $|RSSI_1-RSSI_2|\geq D$, spurious energy on channel 2 (2c)

$PASS_2$: Asserted if $|RSSI_3-RSSI_2|\geq D$, spurious energy on channel 2 (2d)

$PASS_3$: Asserted if $|RSSI_1-RSSI_3|\geq D$, spurious energy on channel 3; and (2e)

$PASS_3$: Asserted if $|RSSI_2-RSSI_3|\geq D$, spurious energy on channel 3 (2f)

Thus, the RSSI compare unite 820 asserts the PASS signal if the corresponding channel is active and its energy is lower than that of other active channels by more than the programmable parameter D.

The spurious CCA detection unit 705 also includes a timer unit 815. The timer unit 815 receives the user-definable parameter T. The timer 815 is triggered by the START signal. Once triggered, the timer 815 counts down determining when the programmable time period T has expired. The START signal is provided by an OR functional unit 810. The OR unit 815 can simply be a logical OR of the three inputs from the edge detector outputs (i.e., CCA_T). The START signal output is indicative of at least one of the multiple inputs being asserted. Thus, once a CCA signal is detected on any of the modems, the timer 815 begins counting down from T. The timer unit 815 provides a TIME EXPIRED output signal responsive to the count down being completed before a subsequent CCA signal is detected.

If a subsequent CCA signal is detected before the count of timer unit 815 completes, the two related CCA signals are simultaneous. If, however, the count expires before a subsequent CCA signal is detected, the timer unit 815 is reset. The START signal starts the timer block.

Figure 9:
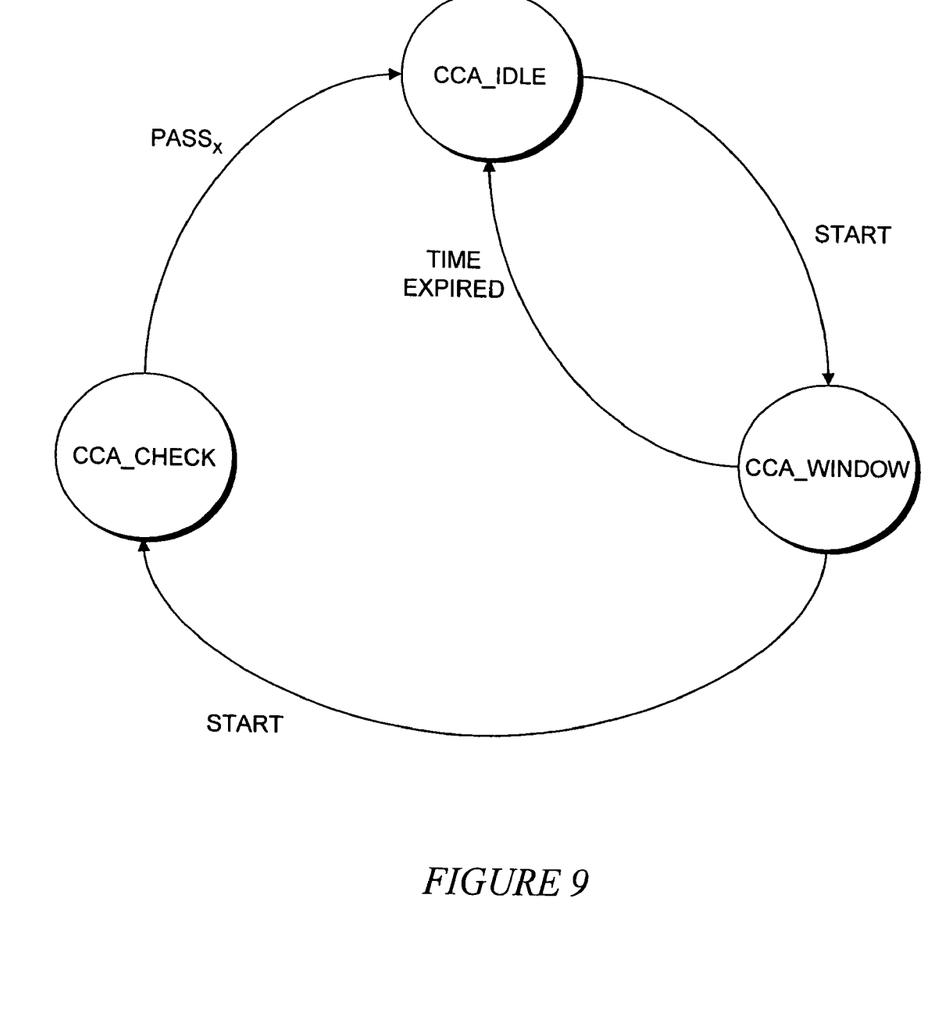
FIG. 9 is an exemplary state diagram implemented within the finite state machine of FIG. 8.

In some embodiments, the finite state machine 825 includes three-states as illustrated in FIG. 9. The first state (i.e., State 1) is identified as CCA_IDLE, the second state (i.e., State 2) is identified as CCA_WINDOW, and the third state (i.e., State 3) is identified as CCA_CHECK. The CCA_IDLE state can be referred to as the default state. Accordingly, the finite state machine 825 waits in this state till a START signal is asserted. The START signal causes a transition from the CCA_IDLE state to the CCA_WINDOW state. The START signal also starts the timer. The finite state machine 825 waits in the CCA_WINDOW state until either the START signal is asserted again, or a TIME EXPIRED (or DONE) signal is asserted indicating that the timer has expired. If a TIME EXPIRED signal is asserted, the finite state machine 825 returns to the CCA_IDLE state. If, however, another START signal is asserted while in the CCA_WINDOW state, the finite state machine 825 transitions to the CCA_CHECK state. The finite state machine 825 waits in the CCA_CHECK state until a PASSx signal is asserted indicating which of the multiple signals is spurious. The PASSx signal causes a transition back to the CCA_IDLE state. Additionally, the SCCAx signal is asserted corresponding to the asserted PASSx signal (the subscript x refers to any one of the three channels).

As described previously, the threshold value T used by the spurious CCA detection unit 615 can be user selectable. Selection of the actual value used can have potentially adverse impact if the value is not set without due care. For example, if the value if T is set too small (i.e., the time window used to determine simultaneity is too narrow), then actual spurious signals may be missed. This situation is referred to as a false-negative event, whereby spurious signals are present, but are not properly characterized as such. Consequently, the channel within which the spurious signal is present will be unavailable to serve other users, when in fact, the channel should be available. This situation could lead to reduced throughput.

On the other hand, if the value of T is set too large (i.e., the time window that determines simultaneity is too wide), then actual signals present on different channels may be inaccurately characterized as spurious. Similarly, in a discrete-time system with finite non-zero time steps, it is possible to classify two genuine CCAs as a spurious CCA. This situation is referred to as a false-positive event, whereby intended signals are mischaracterized as spurious. Consequently, a channel that may be occupied by a valid signal, is characterized as available and subject to interference by another signal that would have otherwise waited its turn according to the "back off" scheme of the contention protocol. Such interference could lead to increased error rates and unacceptable performance. The likelihood of such a false-positive event can be minimized by reducing the size of the "windows" that determine simultaneity—namely, reducing selected value of T.

By providing the ability to vary the threshold T, users have the ability to trade these throughput and error probabilities by suitably defining window sizes. Additionally, the energy criteria can be used for further reducing these error probabilities, thereby making the system even more robust.

The present invention offers several advantages over alternate ways of detecting and eliminating spurious energy. First, the inventive approach operates independent of signal attributes, such as the signal structure, packet structure, and type of modulation used. Additionally, the inventive approach is applicable to any CCA mechanism including energy based techniques, and/or other, more sophisticated techniques. The spurious CCA is detected with a very low latency. The scheme is trivial to implement in hardware and takes advantage of signals provided in many available modem devices.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of processing received signals in a multi-channel communication contention-based system comprising:
   determining appearance of spurious channel activity comprising:
      determining when plural channels become active near simultaneously, said determining comprising comparing respective times of energy arrival events on the channels; and
      when plural channels become active near simultaneously, comparing the signal strengths of the plural channels to identify a spurious channel responsive to the compared signal strengths; and
   characterizing channels with spurious channel activity as available for communication.

2. The method of claim 1, wherein determining when plural channels become active near simultaneously further comprises:
   receiving for each of the plural channels a respective channel activity signal, the channel activity signal being asserted responsive to activity on the respective one of the plural channels;
   determining near simultaneity responsive to one of the channel activity signals being asserted within a predetermined time window of another of the channel activity signals.

3. The method of claim 2, wherein the predetermined time window is user selectable.

4. The method of claim 2, wherein the predetermined time window is between about 2 microseconds and about 4 microseconds.

5. The method of claim 1, wherein the channels are wireless communication channels.

6. The method of claim 1, wherein the plural channels are compliant with IEEE 802.11 standards.

7. The method of claim 1, wherein a spurious channel is identified responsive to the compared signal strengths differing by more than a predetermined amplitude.

8. The method claim 7, wherein the predetermined amplitude is user selectable.

9. In a multi-channel communication contention-based system, a comprising:
   at least two modems, each modem assigned to a respective channel and configured to assert a channel-activity signal responsive to its respective channel becoming active; and
   a spurious signal detector coupled to the at least two modems adapted to identify spurious channel activity responsive to identification of near simultaneity whenever more than one channel activity signals is received within a predetermined time window and further responsive to signal strengths comparison, the spurious signal detector further adapted to transmit a respective channel available signal to the respective modem identified as having spurious channel activity.

10. The receiver of claim 9, wherein the predetermined time window is user selectable.

11. The receiver of claim 9, wherein the predetermined time window is between about 2 microseconds and about 4 microseconds.

12. The receiver of claim 9, wherein the channels are wireless communication channels.

13. The receiver of claim 9, wherein the plural channels are compliant with IEEE 802.11 standards.

14. The receiver of claim 9, further comprising a signal-strength comparator coupled to the at least two modems, each modem providing a signal indicative of a signal strength of its respective channel, the signal-strength comparator adapted to identify a spurious channel responsive to the compared signal strengths differing by more than a predetermined amplitude.

15. The receiver claim 14, wherein the predetermined amplitude is user selectable.

16. A spurious channel activity detector comprising:
- means for determining when plural channels become active near simultaneously; when plural channels become active near simultaneously said means for determining comprising means for comparing respective times of energy arrival events on the channels;
- means for comparing the signal strengths of the plural channels;
- means for identifying a spurious channel responsive to the compared signal strengths; and
- means for characterizing the identified spurious channel as available for communication.

* * * * *